United States Patent

[11] 3,596,743

| [72] | Inventor | Masahiro Yokoyama<br>Nagoya, Japan |
|---|---|---|
| [21] | Appl. No. | 845,264 |
| [22] | Filed | July 28, 1969 |
| [45] | Patented | Aug. 3, 1971 |
| [73] | Assignee | Mitsubishi Denki Kabushiki Kaisha<br>Tokyo, Japan |
| [32] | Priority | Aug. 1, 1968, Aug. 1, 1968 |
| [33] | | Japan |
| [31] | | 43/54566 and 43/54567 |

[54] CONTROL SYSTEM FOR AUTOMATIC STOPPING OF A MACHINE ELEMENT IN A PREDETERMINED POSITION
2 Claims, 2 Drawing Figs.

[52] U.S. Cl. ..................................... 192/142,
112/219 A, 192/18 B, 192/147
[51] Int. Cl. ..................................... F16d 71/04,
F16d 67/06
[50] Field of Search ........................................ 112/219
(A); 192/18.2 B, 144, 142, 147

[56] References Cited
UNITED STATES PATENTS

| 3,352,396 | 11/1967 | Moseley | 112/219 (A) |
| 3,358,629 | 12/1967 | Bono | 112/219 (A) |
| 3,390,746 | 7/1968 | Becker et al. | 192/18.2 B |
| 3,407,910 | 10/1968 | Heidt | 192/144 (X) |
| 3,503,352 | 3/1970 | Peterson | 112/219 (A) |

*Primary Examiner*—Allan D. Herrmann
*Attorneys*—Robert E. Burns and Emmanuel J. Lobato ABSTRACT: Upon decelating a rotary machine, an electric control circuit energizes an electromagnet. A capacitor charges in the normal mode of operation and beings to discharge upon braking of the machine by a brake device. A relay is energized in the normal mode and utilizing a discharge current from the capacitor, closes its normally open contacts thereby connecting the control circuit to a position sensor. The sensor responds to the machine being at one of its predetermined positions during the energization of the electromagnet to stop it through the brake device after which the relay maintains the control circuit disconnected from the sensor through the normally open contacts. A second relay is energized to change that position where the machine is to stop.

CONTROL SYSTEM FOR AUTOMATIC STOPPING OF A MACHINE ELEMENT IN A PREDETERMINED POSITION

BACKGROUND OF THE INVENTION

This invention relates to improvements in a control system for a clutch motor including a fixed point stop mechanism for selectively stopping a rotary load such as a sewing machine at a plurality of predetermined positions.

Lately it has been proposed to first put such a load in the partly clutched mode of operation at a low speed of rotation by the action of the associated electromagnet instead of the use of a complicated speed reduction gearing and then stop the load at its predetermined position when a position sensor senses the load being at that position. With that measure used, experiences have indicated that, before sewing machines for example will have been stopped, the sewing needle has been frequently required to stop at one of its predetermined positions different from its predetermined position to which it was initially set to stop. Also it is highly desirable to permit the particular position where the sewing needle has stopped to be manually adjusted.

SUMMARY OF THE INVENTION

Accordingly it is an object of the invention to provide a new and improved control system for a clutch motor including a fixed point stop mechanism for selectively stopping a driven rotary machine at a plurality of predetermined positions which system can extremely easily change the stoppage of the machine from a preliminarily selected one to a different one of the predetermined positions.

It is another object of the invention to provide a new and improved control system for a clutch motor including a fixed point stop mechanism for selectively stopping a driven rotary machine at a plurality of predetermined positions which system permits the particular position where the machine has been stopped to manually and safely change as by the associated pulley whenever it is necessary to do so and also permits the machine to be restarted in its fully nonloading state after the main driving shaft has been stopped in any state.

According to one aspect of the invention there is provided a control system for a clutch motor including a clutch mechanism manually operative to drive and stop a load, and a fixed point stop mechanism operatively coupled to the clutch motor, characterized in that the fixed point stop mechanism is operative to preliminarily select one of a plurality of predetermined positions where the load can be selectively stopped, thereby to stop the load at the selected one of its predetermined positions and that means are provided manually controlled to drive the load and also to change the setting of the fixed point stop mechanism so as to stop the load at a desired one of its predetermined positions different from the preliminarily selected thereof.

According to another aspect of the invention, there is provided a control system for a clutch motor including a clutch mechanism manually operative to drive and stop a load, and a fixed point stop mechanism operatively coupled to the clutch motor, characterized in that the fixed point stop mechanism is operative to stop the load at predetermined position and that means are provided for disabling the fixed point stop mechanism after the load is stopped at its predetermined position through the operation of the fixed point mechanism.

In a preferred embodiment of the invention, the control system may comprise capacitor means charged during the operation of the load, the capacitor means beginning to discharge when the load is initiated to be braked and ceasing to discharge after the load is stopped at the selected one of its predetermined positions, first relay means energized with a discharge current from the capacitor to close a circuit with the fixed point stop mechanism and second relay means manually controlled to be energized along with the first relay means to change the setting of the fixed point stop mechanism so as to stop the load at a desired one of its predetermined positions different from the preliminarily selected one thereof.

BRIEF DESCRIPTION OF THE DRAWING

The invention will become more readily apparent from the following detailed description taken in conjunction with the accompanying drawing in which.

DESCRIPTION OF THE PREFERRED EMBODIMENTS

While the invention is applicable to a variety of driven rotary machines it is particularly suitable for use with sewing machines and the description will now be made in conjunction with a domestic sewing machine.

Figure 1:
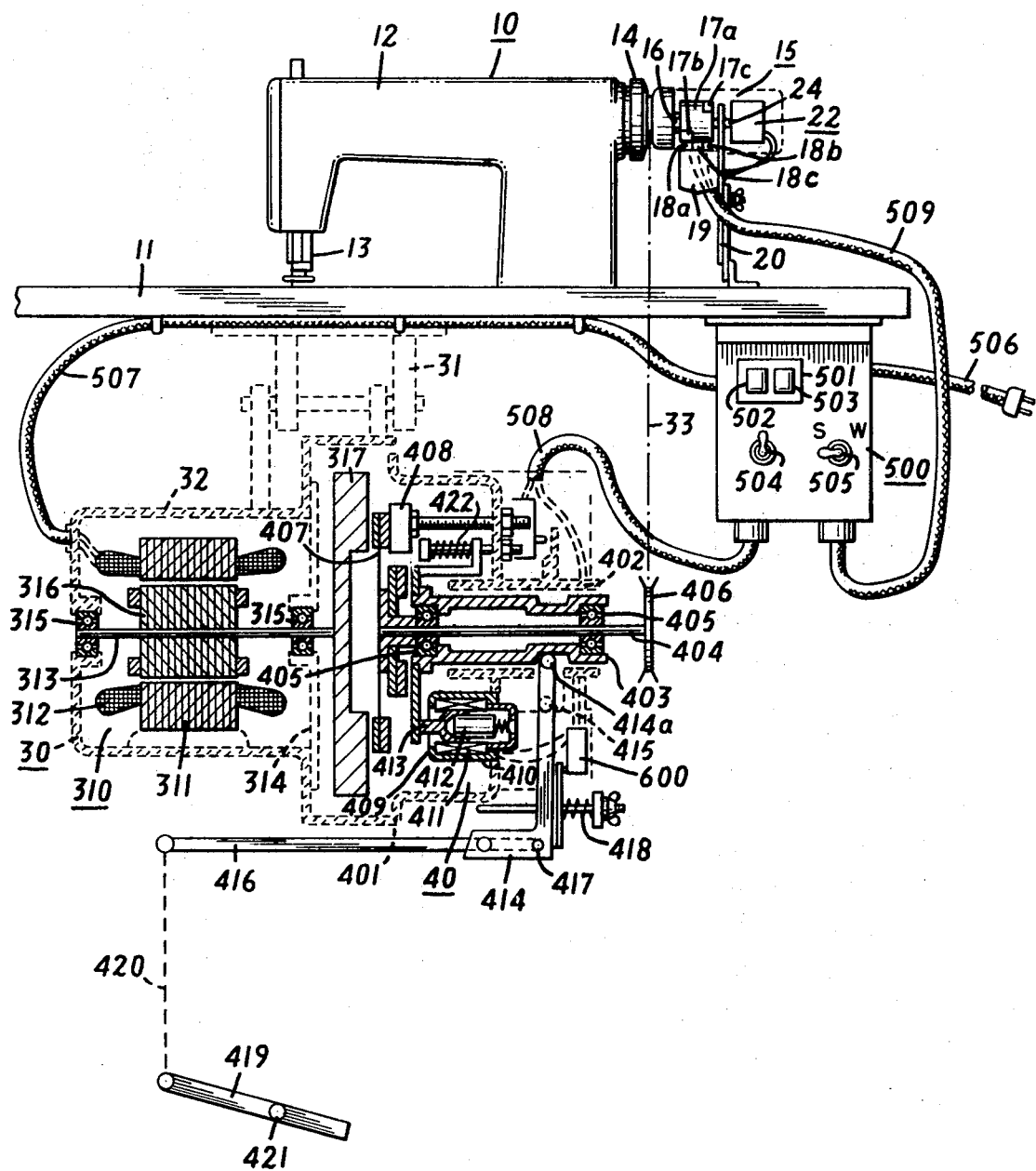
FIG. 1 is a diagrammatic side elevational view, partly in vertical section of a clutch motor with a fixed point stop mechanism to which the invention is effectively applicable.

Referring now to FIG. 1 of the drawing, it is seen that a sewing machine generally designated by the reference numeral 10 comprises a bed 11, a main body 12 fixed upon the bed 11 and a holding rod 13 movably supported by the main body 12 to hold a sewing needle (not shown). The holding rod 13 is operatively coupled to a driven pulley 14 through both a main shaft on which the pulley 14 is also mounted and a cam mechanism disposed within the main body 12 although the main shaft and cam mechanism are not illustrated. Thus the holding rod 13 is adapted to effect one vertically reciprocating movement during one complete revolution of the driven pulley 14 so that the sewing needle has its vertical position as a function of an angle of rotation of the pulley's shaft.

Figure 2:
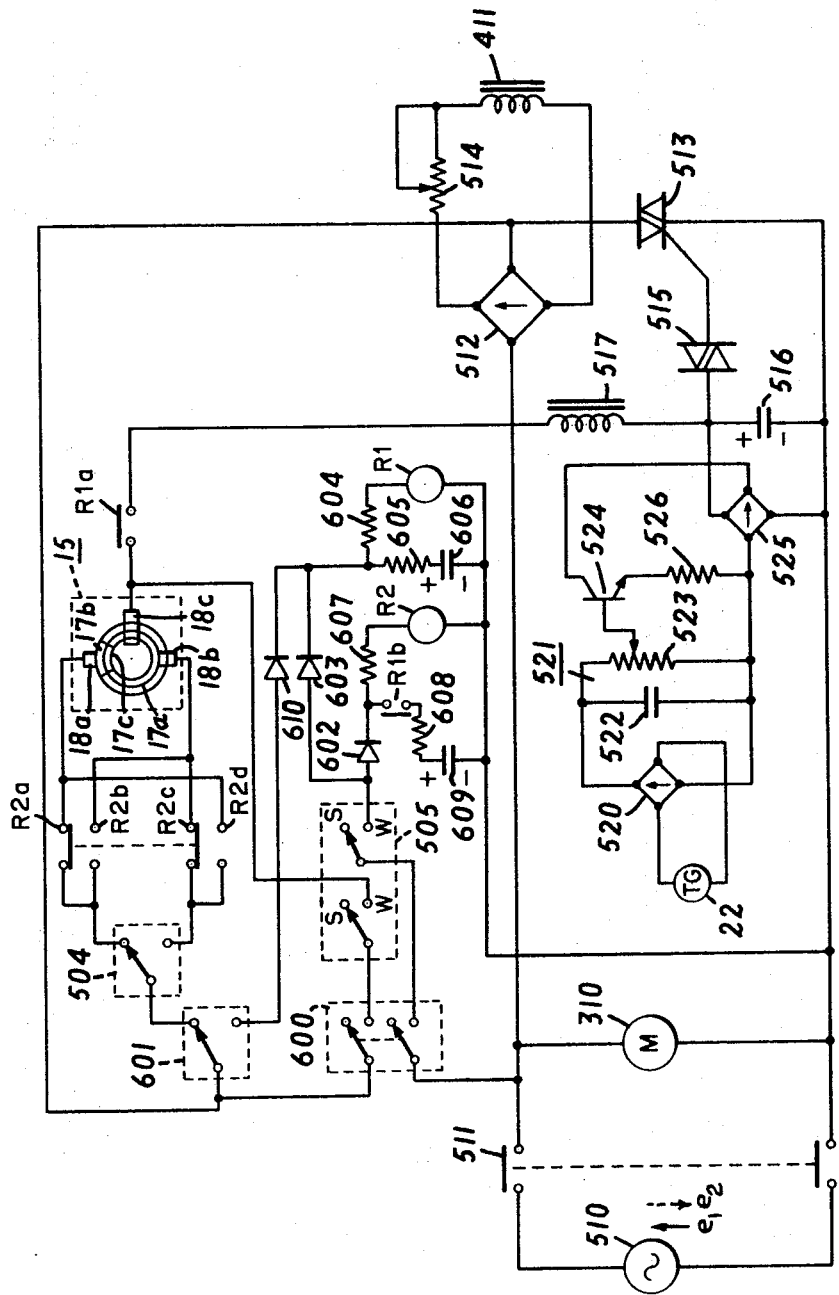
FIG. 2 is a schematic circuit diagram of a control system constructed in accordance with the principles of the invention.

A position-sensing device generally designated by the reference numeral 15 is connected to the driven pulley 14 by having its shaft 16 rigidly fitted into the free end of the main shaft (not shown). The shaft 16 has disposed in electrically insulated relationship thereon an annulus composed of a circular conductive segment 17a, and a pair of circular insulating segments 17b and c, and a first, a second and a third brush 18a, b and c, respectively as also shown in FIG. 2. The first brush 18a is adapted to engage the insulating segment 17b when the sewing needle occupies one of its predetermined positions on the stroke thereof, for example the upper limit thereof while the second brush 18b is adapted to engage the insulating segment 17c when the sewing needle occupies the other of its predetermined positions on the stroke thereof, for example, the lower limit thereof. The third brush 18c is adapted to contact that portion of the annulus 17 including a continuous conductor but not the insulating segments 17b and c. The three brushes 18a, b and c are held by a brush holder 19 which is, in turn, supported by a supporting member 20 serving also to adjust mounting angles for the brushes 18a, b and c. The supporting member 20 has its support bolted to the bed 11.

In order to provide an alternating-current voltage proportional to a rotational speed of the pulley's shaft 16 or a speed at which the sewing needle effects reciprocating movement, a tachometer generator 22 of alternating-current type is provided including a stator member rigidly secured to the holder 19 and a rotor member mounted on a rotary shaft 24 firmly fitted into the shaft 16 of the pulley 14 although both the members are not illustrated.

As shown in FIG. 1, a clutch motor generally designated by the reference numeral 30 is supported to the lower side of the bed 11 through a mounting frame 31. The clutch motor 30 includes a combined drive and control mechanism as will be described hereinafter and a cylindrical housing 32 having one end closed and suspended from the bed 11 through the mounting frame 31. Disposed within the housing 32 is an electric motor 310 including an annular stator core 311 having stator winding 312 inductively disposed around the core 311, a rotary shaft 313 rotatably supported at both ends to the housing 32 and an intermediate bracket 314 fixed to the open end of the housing through a pair of ball bearings 315, and a rotor member 316 mounted on the shaft 313 and encircled with the stator core 312 to form a small annular gap therebetween. A flywheel 317 is rigidly mounted on the rotary shaft 313 at that end projecting beyond the intermediate bracket 314 and provided on the peripheral portion of that surface remote from the bracket 314 with an annular frictional face.

A clutch control unit generally designated by the reference numeral 40 is disposed within and supported by a cylindrical bracket 401 coaxially secured to the other end of the housing 31. Within the bracket 401 a sleeve-type bearing 402 is disposed coaxially with the bracket 401 and, a movable hollow cylindrical bearing member 403 is movably fitted into the sleeve-type bearing 402 and having an output shaft 404 disposed within and supported at both ends to the movable bearing member 403 through a pair of ball bearings 405.

The output shaft 404 is in axially aligned, spaced relationship with the rotary motor shaft 313 and has a driving pulley 406 keyed at that end thereof remote from the motor 310. The driving pulley 406 is then operatively connected to the driven pulley 14 on the sewing machine 10 through an endless belt schematically designated at dot-and-dash line 33 in FIG. 1.

Fixedly mounted on the output shaft 404 at the other end near to the flywheel 317 is a clutch wheel 407 provided on the peripheral portions of both surfaces with a pair of opposite friction annuli. The clutch wheel 407 is normally slightly spaced away from the flywheel 317 and the friction annulus thereof remote from the flywheel normally engages a brake device 408. In order to control the clutch wheel 407 a pair of electromagnet devices (only one of which is illustrated in FIG. 1 for purpose of clarity) generally designated by the reference numeral 409 are disposed in diametrically opposite relationship around the output shaft 404 and suitably fixed to the bracket 401. The electromagnet device 409 includes a stationary iron core 410 in the form of a cup, an exciting winding 411 disposed on the inner wall surface of the stationary core 410 and a movable iron core 412 movably disposed within the interior of the stationary core 410. The movable core 412 has an actuating nonmagnetic rod 413 fixed at one end thereof and loosely extending through the bottom of the "cup."

A first L-shaped operating lever 414 is pivotably mounted on one arm of the "L" to the bracket 401 by a pivot pin 415 and has a stud 414a planted on the one arm and engaging a circumferential recess formed on the movable bearing member 403. The first lever 414 serves to move the movable bearing member 403 and therefore the output shaft 404 toward and away from the rotary motor shaft 313 thereby to permit the clutch wheel 407 to engage and disengage from the flywheel 317. A second L-shaped operating lever 416 is pivotably mounted to the first operating lever 414 by a pin 417 and has one arm normally maintained integral with the one arm of the first lever 414 by the action of a compression spring 418. The second lever 416 has the other arm operatively connected at the free end to a pedal 419 through a connecting rod as shown at broken line 420, which pedal is suitable disposed for pivotal movement about its fulcrum 421.

The bed 11 has suspended from the under side thereof an electric control box generally designated by the reference numeral 500 as shown in FIG. 1. The control box 500 includes an operating panel 501 provided with a pair of pushbuttons 502 and 503 for opening and closing a source switch as will be described hereinafter, and a pair of snap switches 504 and 505 of transfer type for the purposes as will be apparent hereinafter. The control box 500 also has extending therefrom a plurality of electric cables comprising a power cable 506 adapted to be connected to any suitable source of electric current (not shown in FIG. 1), an electric cable 507 connected to the electric motor 310, an electric cable 508 connected to the electromagnet devices 409 and an electric cable 509 connected to both the position sewing device 15 and the tachometer generator 22.

Referring now to FIG. 2 there is illustrated an electric control circuitry disposed within the control box 500. The above-mentioned source of alternating current designated by the reference numeral 510 is electrically connected across the electric motor 310 through the above-mentioned source switch designated by reference numeral 511. The motor 310 is electrically connected across pair of alternating-current input terminals of a single-phase full-wave rectifier 512 through a bidirectional three terminal thyristor 513. The rectifier 512 has a pair of direct-current output terminals electrically connected across the exciting winding 411 on the stationary iron core 410 through a variable resistor 514.

The thyristor 513 includes a gating circuit including a triggering element such as a bidirectional three layer diode 515 and a gating capacitor 516. The bidirectional three layer 515 has such property that it responds to a predetermined voltage Vo or more applied thereacross to abruptly breakdown to decrease the impedance thereacross. When the capacitor 516 has charged to a predetermined magnitude Vo of a voltage with the polarity as illustrated, it fires the corresponding portion of the thyristor 513 while it has charged to the same magnitude Vo with the polarity reversed from that illustrated, it fires the other portion of the thyristor. The capacitor 516 is electrically connected on one side to the above-mentioned brush 18c of the position sensing device 15 through a reactor 517 and the normally open relay contacts RIa.

The cable 509 as shown in FIG. 1 includes, in addition to the leads connected to the brush 18a, leads connecting the tachometer generator 22 across a single-phase full-wave rectifier 520 as shown in FIG. 2. The output of the rectifier 520 is connected to the filtering network generally designated by the reference numeral 521 including a shunt capacitor 522, a variable resistor or potentiometer 523 connected across the capacitor. The network 521 serves to smooth the direct current output from the rectifier 520. The slide on the potentiometer 523 is connected to a base of an NPN-type transistor 524 including a collector and an emitter connected across a single-phase full-wave rectifier 525. More specifically, the collector of the transistor 524 is directly connected to one of diametrically opposite terminals of the rectifier 525 and the emitter thereof is connected to the other terminal of the rectifier through a resistor 526. Then the rectifier 525 includes another pair of diametrically opposite terminals connected across the gating capacitor 516.

FIG. 2 also shows a limit switch or microswitch 600 of two-pole transfer type and a limit switch or microswitch 601 of single-pole transfer type. As shown in FIG. 1, the microswitch 600 is operatively associated with the extremity of the one arm of the second lever 416 and normally in its open position or its upper position as viewed in FIG. 2. When the pedal 419 is rotated in the clockwise direction as viewed in FIG. 1 to rotate the second lever 416 in the same direction, the microswitch 600 is put in its closed position or its lower position as viewed in FIG. 2. On the other hand, the microswitch 601 is operatively associated with the free end of the one arm of the first lever 414 as shown in FIG. 1 and normally in its lower position as shown in FIG. 2. When the pedal 419 is operated to rotate the first lever 414 in the counterclockwise direction as viewed in FIG. 1, the microswitch 601 is in its upper position as viewed in FIG. 2.

As shown in FIG. 2, the microswitch 600 includes one pole connected to the microswitch 601 and the thyristor 513 and the other pole serving to connect the one side of the electric motor 310 to an anode of a semiconductor diode 602 through the corresponding pole of the transfer switch 505 in its closed position. When closed, the one pole of the microswitch 600 is connected to the third brush 18c, of the position sensing device 15 through the corresponding pole of the switch 505 in its closed position. The switch 505 includes an "S" (single) contact and a "W" (Double) contact for each pole and is in its open position when the movable arm engages the "S" contact and in its closed position when it engages the "W" contact.

The anode of the diode 602 is also connected to the other side of the motor 310 via a semiconductor diode 603 and through a resistor 604 and a winding of a relay RI and additionally through a resistor 605 and a capacitor 606. The diode 602 has its cathode similarly connected to the other side of the motor 310 through a resistor 607 and a winding of a relay R2 and also through normally open contacts R1b a resistor 608 and a capacitor 609. The capacitors 606 and 609 are preliminarily selected to have the respective discharge time constants of $T_1$ and $T_2$ where $T_1$ is smaller than $T_2$. The microswitch 601 includes one contact connected to the junction of the resistors 604 and 605 through a semiconductor diode 610 and the other contact connected to the transfer switch 504. The transfer switch 504 then includes one contact connected to normally closed contacts R2a connected to the first brush 18a, and to normally open contacts R2b connected to the second brush 18b, and the other contact connected to normally closed contacts R2c connected to the brush 18b and to normally open contacts R2d connected to the first brush 18a of the position sensing device 15.

The arrangement thus far described is operated as follows: When it is desired to drive the sewing machine 10, the pushbutton 502 can be depressed to close the source which 511 thereby to energize the electric motor 310 by the source 510 to drive the rotary shaft 313. Under these circumstances the pedal 419 is operated to pull down the connection rod 420 thereby to rotate the first and second lever, 414 and 416 respectively, in the counterclockwise direction as viewed in FIG. 1 and about the axis of the pin 415 against the action of the spring 418. This rotational movement of both the levers causes the movable bearing member 403 to be moved toward the rotary motor shaft 313 through the stud 414a while at the same time the microswitch 601 changes from its upper position to its lower position as viewed in FIG. 2. The movement of the movable bearing member 403 toward the rotary shaft 313 causes the output shaft 404 along with its ball bearings 405 to be moved toward the rotary shaft until the friction annulus on the clutch wheel 407 strongly pushes against the flywheel 317 whereupon the clutch wheel 407 is driven. In this event it is noted that any slip hardly occurs between the rotating wheels with the result that the output shaft 404 is rotating at substantially the same rotational speed as does the rotary motor shaft 313. This rotational movement of the output shaft 404 is transferred to the pulley's shaft 16 of the sewing machine 10 through the driving pulley 406, the endless belt 33 and the driven pulley 14. Therefore the holding rod 13 and hence the sewing needle (not shown) is vertically moved to permit the particular sewing operation to be performed.

In this normal mode of operation, the first lever 414 has forced the microswitch 601 downwardly to contact its movable arm with the lower contact thereof as viewed in FIG. 2. This causes the relay R1 to be energized to close its contacts R1a and b. Further the capacitor 606 has charged with the polarity illustrated in FIG. 2. It is also assumed that the transfer switch 504 has been put in its upper position as viewed in FIG. 2 to preset the sewing needle to stop at its uppermost position and further that each movable arm of the transfer switch 505 has been connected to the "W" contact rather than to the "S" contact. On the hand, the microswitch 600 remain inoperative or in its open position in the normal mode of operation. This causes the relay R2 to be maintained in its deenergized state to hold its contacts in open positions as illustrated in FIG. 2.

In addition the microswitch 601 maintains the circuit with the position-sensing device 15 open to prevent the capacitor 516 from charging. Therefore the thyristor 513 is in its open or deenergized position whereby the exciting winding 411 of the electromagnet device 409 has no current flowing therethrough.

Upon stopping the sewing machine 10, the pedal 419 is released to permit the clutch wheel 407 is to be moved away from the flywheel 317 until both the wheels disengage from each other. At that time, the other friction annulus of the clutch wheel 407 is caused to push against the brake device 408 which, in turn, applies a braking action to both the output and pulley shafts, 404 and 16 respectively, to abruptly decrease the rotational speed of the pulley shaft 16.

On the other hand, the release of the pedal 419 permits the first lever 414 to be reset to bring the movable arms of the microswitch 600 into contact with the upper contacts as viewed in FIG. 2. It is here recalled that the transfer switch 504 has been turned on the upper side as viewed in FIG. 2. Under these circumstances, the contacting of the first brush 18a with the conductive segment 17a of the position sensing device 15 completes a circuit traced from the microswitch 601 through the transfer switch 504, the normal closed contacts R2a, the first brush 18a, the conductive segment 17a, the third brush 18c, the closed contacts R1a, the reactor 517 to the capacitor 516. In this event it is noted that the capacitor 606 is prevented from being charged while the relay R1 is maintained energized by virtue of energy accumulated on the capacitor 606.

At the beginning of the process as above described, the pulley shaft 16 will have a fairly high rotational speed to cause the output voltage from the tachometer generator 22 to exceed its predetermined magnitude whereby the transistor 524 has a high base current flowing from the rectifier 520 through its collector-to-emitter circuit enough to put the same through its collector-to-emitter circuit in its fully conducting state. Under these circumstances, a current due to an instantaneous voltage $e_1$ across the source 510 with the polarity illustrated at the solid arrow alongside the source 510 flows through a circuit including the rectifier 525, the transistor 524 and the resistor 526 as shown at the solid arrows alongside the circuit thereby to shunt the gating capacitor 516. This is true in the case of an instantaneous voltage $e_2$ across the source 510 with the polarity illustrated at the dot arrow alongside the source 510. Therefore the voltage across the source 510 with either polarity does not charge the gating capacitor 516 to a magnitude sufficient to effect the breakdown of the triggering element 515. Thus the thyristor 513 remains open to prevent an exciting current from flowing through the electromagnet's winding 411 with the result that the brake device 408 continues still to push against the clutch wheel 407 while the shaft 16 is decreasing its number of rotation in unit time.

After the number of rotation in unit time of the shaft 16 has decreased to a predetermined magnitude, the output voltage from the tachometer generator 22 also decreases to bring the transistor 524 into its conductivity region where the conductivity varies. That is, the transistor 524 increases in resistance between the collector and emitter thereof. This increase in resistance weakens the shunting action exerted upon the gating capacitor 516 permitting the latter to charge to a voltage sufficient to breakdown the triggering element 515. When the source 510 is generating a voltage thereacross in the direction of $e_1$ the capacitor 516 is charged with the polarity illustrated in FIG. 2 until the capacitor 516 fires the corresponding portion of the thyristor 513 at such a phase angle of the voltage that the capacitor has charged to a predetermined magnitude Vo. On the contrary, when the source 510 is generating the voltage thereacross in the direction of $e_2$, the capacitor 516 charges with the polarity reversed from that illustrated until it fires the other portion of the thyristor 513 at such a phase angle of the voltage that the capacitor has charged to the same magnitude Vo but in the reversed direction. This follows that the full wave rectifier 512 rectifies an output waveform of alternating current provided by the thyristor 513 and in accordance with the firing angle thereof to supply the rectified waveform to the winding 411 of the electromagnet device 409.

As the output voltage from the tachometer generator 22 decreases to increase the resistance of the transistor 524, the capacitor 516 increases its charging rate thereby to advance the firing angle of the thyristor 513 resulting in an increase in duration of the alternating-current output waveform provided by the thyristor 513 and therefore, in current flowing through the exciting winding 411. Once the increase in current flowing through the winding 411 has caused a force to overcome the resilience of a spring 422 thereby to permit the stationary core 410 to attract the movable iron piece 412, the clutch wheel 407 disengages from the brake device 408 to be again contacted by the flywheel 317 through the actuating rod 413 and the associated components. However it is noted that the force with which the friction annulus on the clutch wheel 407 is caused to push against the flywheel 317 varies in proportion to the current flowing through the electromagnet's winding 411. Therefore such a force is not sufficiently high and the output shaft 404 is driven by the flywheel 317 while the clutch wheel 407 is slipping with respect to the flywheel 317, that is to say, it is maintained in a partly clutched state. Under these circumstances, a torque transmitted through the clutch wheel 407 to the pulley shaft 16 increases with a decrease in the rotational speed of the main shaft 16. Therefore, the pulley shaft 16 normally effects the sustained rotation whose number of rotation in unit time vibrates about a predetermined relative low magnitude.

During this sustained rotation of the shaft 16, the first brush 18a can contact the insulating segment 17b of the position-sensing device 15. At that time the insulating segment 17b provides a pause interval of time for a charging circuit for the gating capacitor 516 sufficient to permit the electromagnet's winding 411 to be fully deenergized. Thus the winding 411 is deenergized to cause the clutch wheel 407 to again push against the brake device 408 to be braked resulting in the stoppage of the pulley shaft 16. At the same time the sewing needle (not shown) has stopped at the upper end of its stroke corresponding to that angular position of the insulating segment 17b where it contacts the first brush 18a.

On the other hand, the capacitor 606 has the discharge time constant $T_1$ preselected to be larger than an interval of time between a time point when the clutch wheel 407 has been brought into its partly clutched state and a time point when it is completed to stop. Therefore with the microswitch 601 put in its upper position as viewed in FIG. 2, the relay R1 is maintained in its energized state for some predetermined period of time after the clutch wheel 407 has stopped to stop the associated sewing needle at its predetermined position, in this case, at its uppermost position. This is because the charge previously accumulated on the capacitor 606 now discharges through the resistors 605 and 604 and the relay R1 winding even after that capacitor has ceased to charge. After the capacitor 606 has completely discharged, the relay R1 is deenergized whereupon its contacts R1a are open to open the circuit with the position sensing device 15.

If is is at that time attempted to render a circuit with the second brush 18b energized by changing the transfer switch 504 from its upper to its lower position as viewed in FIG. 2, the opening of the relay contacts R1a prevents the pulley shaft 16 from being rotated so as to stop the sewing needle at another predetermined position. That is, once the sewing needle has stopped at the selected one of its predetermined positions, the position sensing device 15 is disabled unless the first lever 414 is again operated to change the microswitch 601 from its upper to its lower position as viewed in FIG. 2 so as to put again the sewing machine 10 in operation.

It is now assumed that for certain reasons it has become necessary to change the sewing needle from its predetermined position initially set to another predetermined position, in this case, its lowermost position. Under the assumed condition, the pedal 419 is required only to be further depressed at its right-hand end as viewed in FIG. 1 to permit the second lever 416 to be rotated in the clockwise direction as viewed in FIG. 1 about the axis of the pivot pin 417 and independently of the first lever 414. This causes the movable arms of the microswitch 600 to engage the lower contacts as viewed in FIG. 2. Therefore the deenergized relay R1 is again energized to close its contacts R1a and Rb while the relay R2 is energized to open its contacts R2a and c and close its contacts R2b and d. Also the capacitors 606 and 609 charge with the respective polarities illustrated. In addition, the circuit for charging the gating capacitor 516 is again completed through a conductor 611 until it again charges to a predetermined voltage. At that time the corresponding portion of the thyristor 513 is fired through the triggering element 515 to permit the electromagnet device 409 to be excited.

Therefore the process as previously described is repeated to engage the clutch wheel 407 with the flywheel 317 whereby the clutch wheel continues to be rotated. Thereafter the pedal 419 is released to return back to its original position as illustrated in FIG. 1 whereupon the microswitch 600 is put in its open position where the circuits with the relays R1 and R2 are also open. However, since the capacitors 606 and 609 still have the respective charges accumulated thereon, both the relays R1 and R2 continue to have currents flowing therethrough. This permits the contacts R1a and b, R2b and d to be still in their closed position and the contacts R2a and c to be still in their open position. Under these circumstances, when the second brush 18b contacts the insulating segment 17c to open the circuit with the position sensing device 15, the circuit for charging the gating capacitor 516 is open because of the opening of the microswitch 600. This results in the sewing needle stopping at its lowermost position corresponding to the angular position where the second brush 18b contacts the insulating segment 17c. In other words, the needle stops at its lowermost position different from its uppermost position initially set. Thus it will be appreciated that the desired purpose has been accomplished only by additionally depressing the right-hand end of the pedal 419 from its position as illustrated in FIG. 1.

As previously described, the time constant $T_1$ of the capacitor 606 has been chosen to be sufficiently high. Therefore after the sewing machine has completely stopped the relay R1 is deenergized. That is, the contacts R1a and b are open after the sewing machine has completely stopped. Also it is recalled that the time constant $T_1$ of the capacitor 606 is smaller than the time constant $T_2$ of the capacitor 609. Thus the relay R2 is deenergized after the relay R1 has been deenergized with the result that after the sewing machine has stopped, the contacts R1a and b are open followed by the resetting of the contacts of the relay R2 to their positions as shown in FIG. 2.

From the foregoing it will be appreciated that the invention has provided a control for stopping the associated load such as a sewing machine at its predetermined position different from its position where the load has initially set to stop whenever it is necessary to do so. Also in the case the load after having stopped is desired to be finely adjusted in its stopped position or to its particular position other than its predetermined positions, its stopped position can be manually adjusted in an easy manner because the position sensing device has been disabled. Further, if the pulley or the like has been carelessly rotated, the load is effectively prevented from being abruptly operated due to the position-sensing device beginning to be actuated as in the prior-art-type controls. Thus there is no fear that the operator's hand may be caught in the endless belt.

What I claim is:

1. A control system comprising: an electric clutch motor operable when energized to provide rotary output motion, a rotary machine having a rotary motion output, means including a movably mounted clutch wheel movable into and out of clutching engagement with said electric motor for transmitting the rotary output motion of said motor to said rotary machine to effect operation of same in a normal mode of operation, brake means for applying a braking action to said rotary machine to progressively terminate the rotary motion of same, position-sensing means for sensing a selected one of a plurality of predetermined positions where said rotary machine is to be selectively stopped, electromagnetic means operative when excited to effect movement of said clutch wheel into a partly clutched mode of operation through an electromagnetic force developed therefrom, electric control means responsive to decrease in the rotational speed of said rotary machine to effect energization of said electromagnetic means, capacitor means charged with a predetermined polarity during said normal mode of operation of said rotary machine and initiated to discharge subsequent to a predetermined degree of braking of said rotary machine by said brake means, charging circuit means for charging said capacitor means, a relay means including a set of normally open contacts energized by said charging circuit means during said normal mode of operation to close said set of normally open contacts, means for energizing said relay means with a discharge current from said capacitor means rather than by said charging circuit means upon the application of said braking action and thereafter thereby to maintain said set of normally open contacts in their closed position, said relay means including means responsive to the termination of the discharge of said capacitor means to effect deenergization thereof and opening of the closed contacts, said position sensing means including means responsive to said rotary machine being at a selected one of said plurality of predetermined positions during the excitation of said electromagnetic means to render said electric control means effective to deenergize said electromagnetic means, whereby said brake means stops said rotary machine while said set of normally open contacts are moved to disconnect said electric control means from said position-sensing means through the termination of the discharge of said capacitor means.

2. A control system for a clutch motor as claimed in claim 1 further comprising another relay means manually controlled to be energized along with said first-mentioned relay means to selectively change the setting of said position sensing means to effect stopping of said rotary machine at a position different from one of said plurality of predetermined positions.